(12) United States Patent
Krueger et al.

(10) Patent No.: US 7,969,142 B2
(45) Date of Patent: Jun. 28, 2011

(54) SYSTEM AND METHOD FOR MAGNETIC TRACKING OF A SENSOR HAVING AN ASYMMETRIC MAGNETIC CORE

(75) Inventors: Sascha Krueger, Hamburg (DE); Bernhard Gleich, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 630 days.

(21) Appl. No.: 11/996,617

(22) PCT Filed: Jul. 12, 2006

(86) PCT No.: PCT/IB2006/052373
§ 371 (c)(1),
(2), (4) Date: Jan. 24, 2008

(87) PCT Pub. No.: WO2007/015180
PCT Pub. Date: Feb. 8, 2007

(65) Prior Publication Data
US 2008/0231264 A1    Sep. 25, 2008

Related U.S. Application Data

(60) Provisional application No. 60/705,617, filed on Aug. 4, 2005.

(51) Int. Cl.
*G01B 7/14* (2006.01)
*A61B 5/05* (2006.01)
(52) U.S. Cl. .................................. 324/207.16; 600/424
(58) Field of Classification Search .......................... None
See application file for complete search history.

(56) References Cited

U.S. PATENT DOCUMENTS

| | | | |
|---|---|---|---|
| 4,406,999 A * | 9/1983 | Ward | 340/870.31 |
| 4,737,794 A | 4/1988 | Jones | |
| 4,945,305 A | 7/1990 | Blood | |
| 5,211,165 A | 5/1993 | Dumoulin et al. | |
| 5,307,072 A | 4/1994 | Jones, Jr. | |
| 5,377,678 A | 1/1995 | Dumoulin et al. | |
| 5,558,091 A | 9/1996 | Acker et al. | |
| 5,592,939 A | 1/1997 | Martinelli | |
| 5,600,330 A | 2/1997 | Blood | |
| 5,752,513 A | 5/1998 | Acker et al. | |
| 6,404,192 B1 * | 6/2002 | Chiesi et al. | 324/253 |
| 6,462,536 B1 * | 10/2002 | Mednikov et al. | 324/207.16 |
| 2001/0045825 A1 * | 11/2001 | Sundin | 324/207.16 |

FOREIGN PATENT DOCUMENTS
WO    WO9404938    3/1994
WO    WO9605768    2/1996

OTHER PUBLICATIONS

Seiler et al, "A Novel Tracking Technique for the Continuous Precise Measurement of [Tumor] Positions in Conformal Radiotherapy", Phys. Med. Biol. 2000, N103-N110.

* cited by examiner

*Primary Examiner* — Jay M Patidar

(57) ABSTRACT

A system and method for determining the location of a remote object connected to an induction coil using a magnetic tracking sensor. The system and method include locating a magnetic core asymmetrically disposed within the induction coil located near the remote object, and operably connecting a single DC electrical circuit o ends defining the induction coil. The DC electrical circuit provides a DC current to the induction coil while the induction coil is disposed in an external AC magnetic field. The DC current adjusts the level of saturation of the magnetic core, and hence varies a response signal of the induction coil disposed in the external AC magnetic field to provide magnetic tracking of the induction coil.

19 Claims, 2 Drawing Sheets

SYSTEM AND METHOD FOR MAGNETIC TRACKING OF A SENSOR HAVING AN ASYMMETRIC MAGNETIC CORE

CROSS REFERENCE TO RELATED APPLICATIONS

This application claims the benefit of International Application Number PCT/IB2006/052373, filed Dec. 7, 2006, and U.S. Provisional Application Ser. No. 60/705,617 filed. Aug. 4, 2005 which are incorporated herein in whole by reference.

The present disclosure relates to magnetic tracking systems of the type wherein a magnetic field is established in a relevant work area, and one or more magnetic field sensors are operated to sense values of a local magnetic field and are processed to determine the position of a tool, instrument or other identified object. In general, such systems operate using a field generating element or assembly, and a field sensing element or assembly, often in conjunction with an interventional surgical tool, such as a catheter, to track the relative changes in position between one or more fixed points or structures in the physical environment or associated images, and one or more moving or non-visible points or structures in the work area.

Magnetic field generating or sensing assemblies for tracking may be implemented in various ways, with conventional analog wire coils forming current loops or paths, or with semiconductor or microlithographically-formed conductive leads or circuit board traces forming current paths, arranged in an appropriate geometry to generate or sense the desired field components. There may be a symmetry or duality between the generating or sensing elements. Thus, for example in many cases it is possible to have a small multi-coil array that generates a spatially distributed magnetic field and a similar or even identical array that senses the field so generated. Small coils offer the prospect of generating, to a close approximation, dipole fields, although small size may limit the attainable field strength or the achievable level of detection signal amplitude. The generating and sensing constructions may alternatively employ different scales, for example, with relatively large and/or high current coils to establish magnetic field components along different axes, and smaller, or more localized coil assemblies for sensing field values. Smaller coils, whether for sensing or generating, may, for example, be fastened to the body, or attached to workplace or surgical instruments, or to catheters or other body-inserted devices, to sense the magnetic field and track position of the attached structure.

In general, it is the aim of such magnetic tracking assemblies to define the spatial coordinates (e.g., position and orientation coordinates, either absolute or relative) where the movable magnetic assembly is located at a given instant in time. It is therefore necessary to characterize the magnetic field distribution or signal values with some degree of accuracy, and also necessary to accurately detect the field. The field distribution may be determined by a combination of field modeling and empirical field mapping. The latter, for example, may be carried out as a calibration or an initialization step, and may be performed to correct a theoretical field distribution for the presence of interfering structures. In any case, the spatial coordinates are generally computed for one magnetic assembly (transmitter or sensor) with respect to the other magnetic assembly (sensor or transmitter). Typically, one of these assemblies is itself fixed.

Most magnetic tracking that provide five or six-degree of freedom measurements (the difference usually being whether sensor roll is determined) utilize a model of one form or another for the magnetic field generators. Dipole and enhanced dipole models are found in Jones (U.S. Pat. Nos. 4,737,794 and 5,307,072), Blood (U.S. Pat. No. 4,945,305), Dumoulin (U.S. Pat. Nos. 5,211,165 and 5,377,678), Bladen (WO 94/04938) and Ben-Haim (WO96/05768), among others. Other models are found in Blood (U.S. Pat. No. 5,600, 330) and Acker (U.S. Pat. No. 5,752,513) which use a line segment current source whose field varies inversely with range. These models fall apart near the vertices of the field generators. Still other models are found in Acker (U.S. Pat. No. 5,558,091) and Martinelli (U.S. Pat. No. 5,592,939) which use quasi-linear/uniform field generation, among others.

One area in which magnetic tracking has been useful is the area of image guided surgery. Typical image guided surgical systems acquire a set of images of an operative region of a patient's body, and track a surgical tool or instrument in relation to one or more sets of coordinates, e.g., spatial coordinates of the surgical work arena, the coordinates of the images themselves, or a target feature of the patient's anatomy. At the present time, such systems have been developed or proposed for a number of surgical procedures and are useful for position measurements in environments with line-of-sight restrictions. Among many others the localization of medical devices inside a living being is an important application. As an example, catheters and guidewires may be tracked in many interventions. One of the foremost challenges of using magnetic tracking in combination with interventional devices is miniaturization and parallelization of the sensors.

A popular system, classifiable as an alternating current (AC) magnetic tracking system, is described in a paper by Seiler et al., titled "A novel tracking technique for the continuous precise measurement of [tumor] positions in conformal radiotherapy" (Phys. Med. Biol., 2000, N103-N110), the contents of which are incorporated by reference in their entirety. The tracking system described therein uses coil inductors as sensors. A medical device (e.g. guidewire, catheter) can be equipped with these sensors and thus be made trackable. The sensors need to be very small, otherwise the device properties would be altered significantly which is not clinically acceptable. Smaller guidewires (e.g. 0.011 inch) are therefore especially challenging when six degrees of freedom (6DOF) have to be tracked. Conventional 6DOF sensors consist of at least two non-collinear coil inductors and therefore require even more space than a single coil inductor. Additional sensors for tracking multiple sections of the interventional device are usually added in parallel and each requires its own electric circuit.

Thus, there is a need for a system and method that enables 6DOF magnet tracking requiring little space, requiring only one electric circuit and that can be operated serially.

The present disclosure provides a sensor, system and method for determining the location of a remote object using magnetic tracking. In one embodiment, a magnetic tracking sensor includes: an induction coil; a magnetic core asymmetrically disposed within the induction coil; and a DC electrical circuit operably connected to ends defining the induction coil. The DC electrical circuit provides a DC current to the induction coil to adjust the saturation of the magnetic core, thereby influencing a response signal of the induction coil disposed in an external AC magnetic field to provide 6DOF magnetic tracking of the induction coil.

The present disclosure also provides a system for determining the location of a remote object. The system includes a magnetic core asymmetrically disposed within an induction coil; a DC electrical circuit operably connected to ends defining the induction coil to provide a DC current to the induction coil; a data acquisition system adapted to receive a response signal from the induction coil; and a monitor operably coupled to the data acquisition system. The DC current is applied to adjust a saturation level of the magnetic core and thereby influence a response signal of the induction coil disposed in an external AC magnetic field to provide 6DOF magnetic tracking of the induction coil viewable on the monitor.

The present disclosure also provides a method for determining the position and orientation of a remote object. The method includes disposing a magnetic core asymmetrically within an induction coil; connecting a DC electrical circuit to ends defining the induction coil to provide a DC current to the induction coil; disposing the induction coil in an external AC magnetic field; and applying the DC current to adjust a level of saturation of the magnetic core thereby influencing a response signal from the induction coil disposed in the external AC magnetic field providing 6DOF magnetic tracking of the induction coil.

Additional features, functions and advantages associated with the disclosed sensor, system and method will be apparent from the detailed description which follows, particularly when reviewed in conjunction with the figures appended hereto.

To assist those of ordinary skill in the art in making and using the disclosed system and method, reference is made to the appended figures, wherein.

Figure 3:
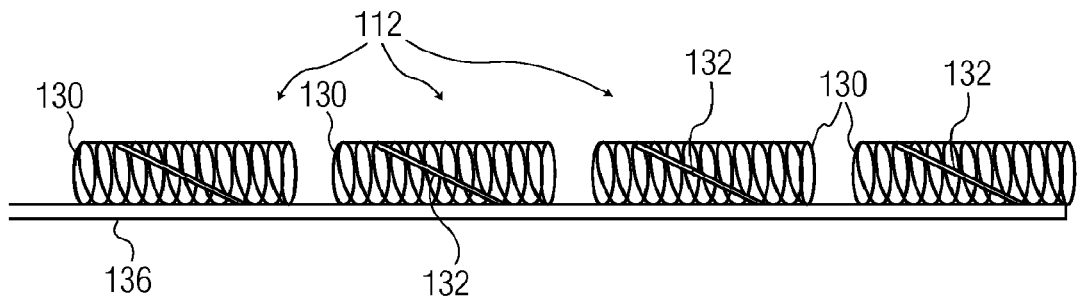
Figure 4:
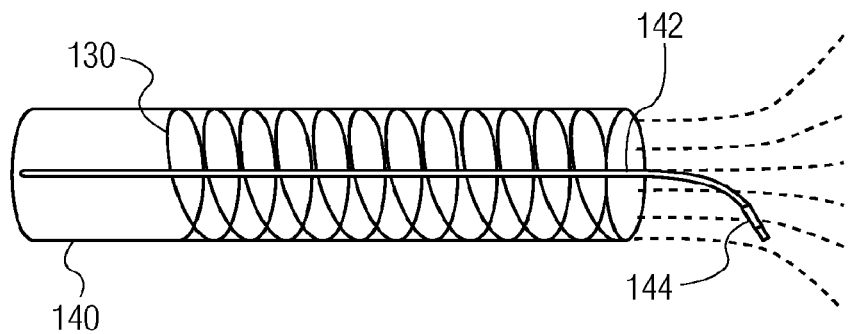

FIG. 3 illustrates a schematic diagram of a 6DOF sensor including a series of mini-sensors including serially collinearly connected coils each having a soft magnetic wire diagonally disposed therein in an alternative exemplary embodiment of the present disclosure; and FIG. 4 illustrates a catheter equipped with a coil inductor and guidewire with a g-metal section for relative tracking of the guidewire tip with respect to the catheter.

As set forth herein, the present disclosure advantageously permits and facilitates 6DOF magnetic tracking with one or several sensors on a small diameter device (e.g., guidewire or catheter) requiring only a single electric circuit. The present disclosure may be advantageously employed to support the guidance of instruments in difficult vessel geometries or when passing stenosis. When the sensors are serially oriented, the present disclosure advantageously allows the shape and positions of a complete section of a guidewire to be estimated. Multiple 6DOF sensors also allow estimation of the mechanical state of the guidewire (e.g., strain map).

Figure 1:
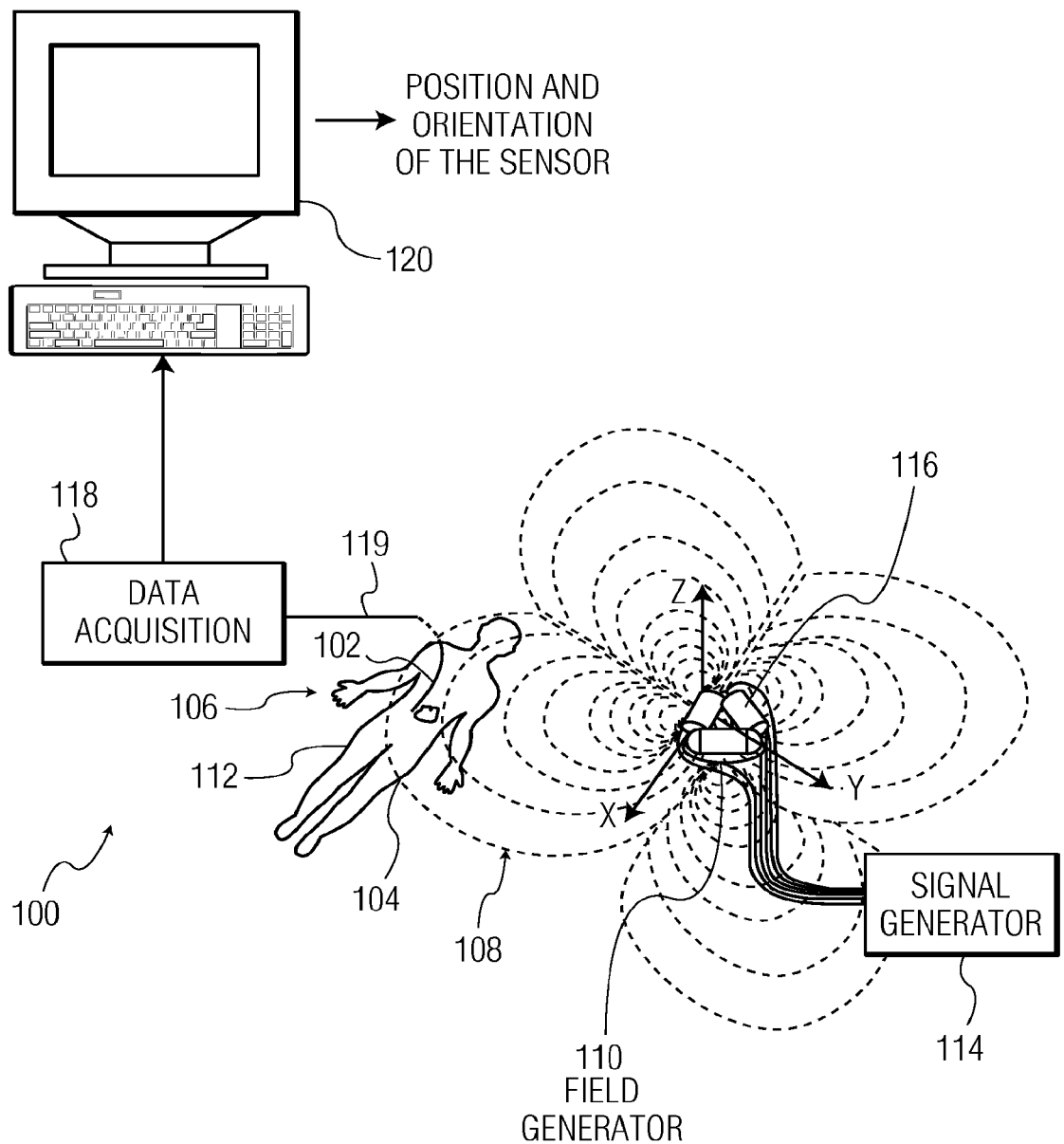
FIG. 1 is a schematic drawing of a sensor of a magnetic tracking system operably connected to a catheter disposed in a body of a patient.

With reference to FIG. 1, an exemplary AC magnetic tracking system 100 is schematically depicted. Magnetic tracking system 100 is employed with an interventional device 102, such as a catheter, for sensing position and orientation of catheter 102 relative to a target area 104 within a body of a patient 104. System 100 uses magnetic fields 108 as information carriers between a field generator 110 and a field sensor 112, similar to other magnetic tracking applications known in the art. In an exemplary embodiment, field sensor 112 includes very small implantable sensors 112 disposed on a distal tip of catheter 102 providing precise measurements at a high repetition frequency. Field generator 110 is operably connected to a signal generator 114 to generate alternating fields of about 12 kHz, for example, to penetrate the human body practically undisturbed.

Field generator 110 includes six differential coils 116 forming the edges of a tetrahedron shaped assembly. Each differential coil 116 consists of two coils of opposite polarization which are positioned behind each other on the same axis. Therefore, during half a period of the alternating field, the magnetic pole array is varied from S-N-N-S to N-S-S-N, S meaning south pole and N north pole. Such a coil arrangement creates a multi-pole field with a dominant quadrupole component. Each coil 116 contains 83 windings of copper wire wound on a core (not shown) made of synthetic material. The differential coils are assembled with the help of interconnecting plastic pieces to form a tetrahedron with an edge length of about 16 cm; however, other shapes and dimensions are contemplated as well.

Sensor 112 is essentially a miniaturized induction coil made of about a thousand windings of insulated copper wire having a diameter suitably sized with respect to the interventional device 102 associated therewith. Sensor 112 may be coated with a very thin film of synthetic material. The alternating magnetic field 108 created by field generator 110 induces an alternating voltage in sensor 112, which is measured by the connected data acquisition electronics 118 providing position and orientation of sensor 112 on a monitor 120.

Figure 2:
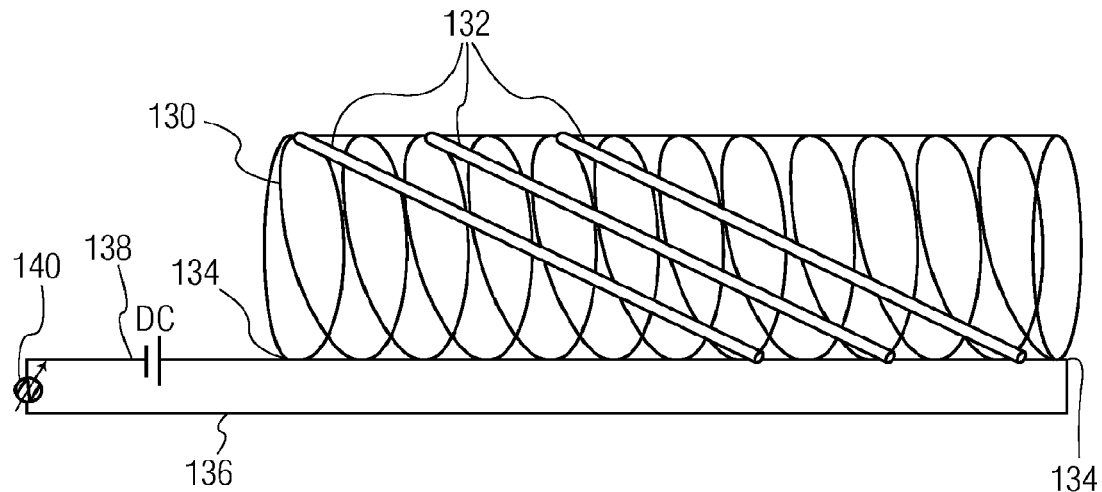
FIG. 2 illustrates a schematic diagram of a 6DOF sensor including a coil winding having three diagonal soft magnetic wires disposed therein in an exemplary embodiment of the present disclosure.

Referring now to FIG. 2, the present disclosure is directed to a small 6DOF sensor 112 which can be operated serially. Sensor 112 includes an induction coil 130 having one or several soft magnetic wires 132 mounted diagonally inside induction coil 130 as a magnetic core (three shown). The soft magnetic wires 132 include all suitable materials with sufficiently low coercivity and suitable shape, e.g., sufficiently low diameter/length aspect ratio as described below. In one embodiment, the soft magnetic wires 132 may be a μ-metal (which is defined as: 5Cu, 2Cr, 77Ni, with a remaining portion being iron). It should be noted that the demagnetizing factor of a soft magnetic wire is very small; therefore the efficiency of focussing magnetic flux is very high. Opposing ends 134 of coil 130 is electrically connected to a direct current (DC) circuit 136 including a DC power supply 138 and data acquisition electronics depicted schematically as meter 140.

In exemplary embodiments, the soft magnetic wire consists of a material with coercivic force less than 800 A/m, and preferably less than 80 A/m. Materials with these properties are known from the literature and well-known to those skilled in the pertinent art. The shape should be designed in such a way that a demagnetizing factor N of less than $10^{-2}$, and preferably less than $10^{-3}$ is provided. For a rod-shaped wire this would correspond to diameter-to-length aspect ratios of between about 1/20 and about 1/70. It should be mentioned that the simplest working example would be a drawn wire with corresponding geometry. Alternatively, a braid could be used or even a matrix of magnetic sub-elements (of arbitrary demagnetizing factor) arranged in such a way that the desired demagnetizing factor is established (e.g., aligned magnetic micro-spheres) or even a cylindrical rod with higher diameter-to-length aspect ratio coated with a thin magnetic layer to obtain the required anisotropy (demagnetizing factor).

The task of soft magnetic wire 132 is to variably focus the external magnetic fields 108. The variability arises due to the possibility of saturating the magnetization of the soft magnetic wires 132 by applying an additional DC magnetic field during readout. The DC magnetic field is created by passing a DC current through coil 130 via DC circuit 136 using DC power supply 138. The strength of the DC current and the properties of each sensor coil 130 determine whether a sensor/soft magnetic wire is saturated or not. A magnetically saturated soft magnetic wire 132 however does not contribute to the AC response due to external AC magnetic field 108. Thus the influence of soft magnetic wire 132 on the signal contribution of sensor 112 can be adjusted by the applied DC current.

As illustrated in FIG. 2, the diagonally disposed soft magnetic wire 132 additionally cancels the symmetry of the coil 130. The axial symmetry of the solenoid is cancelled due to the diagonal positioning of the wire. Thus the sensor signals are now roll angle dependent, yielding a 6DOF sensor. In contrast, conventional sensors without a core or having a core coaxially disposed with the coil windings are not roll angle dependent because of the symmetry of the coil.

A 6DOF measurement is carried out by consecutively measuring the induced voltage with soft magnetic wire 132 being passive or active, (e.g., saturated or not) respectively. This is analogous to measuring the induced voltage in two non-collinear coils, as soft magnetic wire 132 is predominantly magnetized along a longitudinal axis defining its length and therefore yields a linear independent measurement. As in the Seiler et al. reference disclosed above, it is assumed that several gradient fields can be activated in one tracking sequence to provide enough independent measurements to solve for the 6DOF.

FIG. 3 illustrates four sensors 112 serially connected to one electrical circuit 136. The signal responses provided to data acquisition 118 will be a superposition of the signals from each of the single sensors 112 when addressed by a single cable 119 (see FIG. 1) or single circuit 136. However, by using different soft magnetic wires 132 and applying different DC currents to electrical circuit 136, the signals are separable. For each DC current value provided in electrical circuit 136, a certain fraction of sensors/soft magnetic wires can be saturated. For example, while others remain in the linear domain of magnetization, some are already in the non-linear domain. These different responses, (especially non-linearities) can be detected and used for the measurement sequence. In this manner, the amplitude of the DC voltage provided in DC electrical circuit 136 is an additional free parameter to create separable overall signals. To address different sensors within the array, the DC voltage is optionally stepwise altered during a measurement sequence.

The actual position measurement can also be carried out inversely, as described below. The field generator would then create a DC field while an AC current is passed through the micro-coil to be tracked. The impedance of the coil is consecutively measured yielding the local DC field and therefore the position. This DC-based technology is also well-known (see e.g., Ascension Technologies: "Flock of Birds" Tracking System) and offers the advantage of being less sensitive to conductive materials while the AC technique is less disturbed by magnetic material. Such a technique could be used in addition to above described method, e.g., by interleaving both types of measurements, to enhance measurement accuracy or to detect problems due to either conductive or magnetic material. It should be noted though that the inverse technique does not allow for a 6D measurement, but only 5D, because the saturation cannot be used to yield an independent measurement anymore.

Other free parameters include the amplitude or the time-shape of the AC magnetic field 108. These parameters can be exploited analogously to the DC current strength, as the AC magnetic field 108 also influences the non-linear behaviour of each sensor 112. In addition, the spatial AC magnetic field amplitude distribution can be varied during a measurement sequence. These additional free parameters may be used to support the unfolding of the signal (e.g., separable response signal). Therefore, the unfolding of the signal is generally not a major issue. Alternatively, other non-linear elements, including diodes, for example, may be employed to separate the signals.

It will be recognized by those skilled in the pertinent art to which the present disclosure is concerned that the manufacturing of a medical interventional device equipped with the proposed magnetic tracking sensor(s) can be accomplished with similar methods as used for ordinary magnetic tracking devices. One such application for the above described magnetic tracking sensor(s) includes multiple 6DOF trackable small-diameter guidewires as used in coronary intervention, for example. Such devices greatly support the guidance of the instruments in difficult vessel geometries or when passing stenosis.

Further, the serializability allows estimation of the shape and position of a complete section (e.g., 10-20 cm of the distal end) of the guidewire. This can help to navigate in complex vessel trees. The shape information can be also used to improve the registration to a pre-procedural image (e.g., road-map). Moreover, multiple 6DOF sensors allow for the estimation of the mechanical state of the guidewire (e.g., strain map).

Referring now to FIG. 4, a short-range relative tracking arrangement may include a catheter 140 equipped with a coil 130 at a distal end of the catheter and a guidewire 142 containing G-metal 144 in a section to be tracked (e.g., tip). The μ-metal 144 in the tip of the guidewire 142 contributes to the signal and the relative position can be determined. The arrangement of FIG. 4 would also automatically provide a method for motion compensated relative tracking if catheter 140 is fixed with respect to the surrounding tissue and may provide a means for navigation where high relative accuracy is mandatory. A typical example is the crossing of chronic total occlusions or extremely narrow stenosis with a guidewire.

In sum, the present disclosure can be implemented with medical interventional devices, such as a guidewire and/or catheter, for example, used in interventional procedures, particularly when navigating complex vessel trees. The 6DOF sensor may be based on only one coil using one or several magnetic μ-metal wires as magnetic cores, which can be part of the interventional device. The functional application of the present disclosure allows a 6DOF measurement with a single coil yielding roll angle dependent sensor signals.

The disclosed system, apparatus and method provide significant benefits to users of medical interventional device systems, particularly physicians navigating a guidewire and/or catheter during intervention procedures. Indeed, the disclosed system, apparatus and method offer a correspondingly sized sensor for use in conjunction with small diameter devices supporting guidance of instruments in difficult vessel geometries or when passing stenosis. In particular, the disclosed system, apparatus and method offer 6DOF magnetic tracking using only one DC electric circuit no matter the number of sensors employed, all sensors being addressable with a single cable. In this manner, serial orientation of multiple sensors allows estimation of the shape, position and mechanical status of a complete section of guidewire.

Although the system, apparatus and method of the present disclosure have been described with reference to exemplary embodiments thereof, the present disclosure is not limited to such exemplary embodiments. Rather, the system, apparatus and method disclosed herein are susceptible to a variety of modifications, enhancements and/or variations, without departing from the spirit or scope hereof. Accordingly, the present disclosure embodies and encompasses such modifications, enhancements and/or variations within the scope of the claims appended hereto.

The invention claimed is:

1. A magnetic tracking sensor for determining the location of a remote object, comprising:
   an induction coil connectable to the remote object;
   a magnetic core asymmetrically disposed within the induction coil; and
   a DC electrical circuit operably connected to ends defining the induction coil, the DC electrical circuit providing a DC current to the induction coil to adjust an influence the magnetic core has on a response signal of the induction coil disposed in an external AC magnetic field and provide magnetic tracking of the remote object based on the response signal.

2. The magnetic tracking sensor of claim 1, wherein the magnetic core is a soft magnetic wire noncoaxially disposed within the induction coil.

3. The magnetic tracking sensor of claim 2, wherein the soft magnetic wire is defined by opposing ends disposed against opposing sides defining an interior of the induction coil.

4. The magnetic tracking sensor of claim 2, wherein the magnetic core includes a plurality of soft magnetic wires substantially parallel to one another and noncoaxially disposed within the induction coil.

5. The magnetic tracking sensor of claim 1, further comprising a plurality of induction coils operably connected to the DC electrical circuit.

6. The magnetic tracking sensor of claim 1, wherein the induction coil includes a series of collinear induction coils each having a noncoaxially aligned soft magnetic wire as the magnetic core, the series of collinear induction coils operably connected to the DC electrical circuit.

7. The magnetic tracking sensor of claim 1, wherein the magnetic core includes three soft magnetic wires substantially parallel to one another and noncoaxially disposed within the induction coil.

8. The magnetic tracking sensor of claim 1, wherein the DC electrical circuit includes a DC power supply and a signal response acquisition device.

9. The magnetic tracking sensor of claim 1, wherein the magnetic core is diagonally disposed within the induction coil to cancel axial symmetry of the induction coil.

10. A system for determining the location of a remote object, comprising:
    an induction coil connectable to the remote object;
    a magnetic core asymmetrically disposed within the induction coil;
    a DC electrical circuit operably connected to ends defining the induction coil, the DC electrical circuit providing a DC current to the induction coil to adjust an influence the magnetic core has on a response signal of the induction coil disposed in an external AC magnetic field;
    a data acquisition system adapted to receive a response signal from the induction coil; and
    a monitor operably coupled to the data acquisition system, wherein magnetic tracking of the induction coil is viewable on the monitor.

11. The system of claim 10, wherein the magnetic core is a soft magnetic wire noncoaxially disposed within the induction coil.

12. The system of claim 11, wherein the soft magnetic wire is defined by opposing ends disposed against opposing sides defining an interior of the induction coil.

13. The sensor of claim 10, wherein the magnetic core is a plurality of soft magnetic wires substantially parallel to one another and noncoaxially disposed within the induction coil.

14. The system of claim 10, further comprising a plurality of induction coils operably connected to the DC electrical circuit.

15. The system of claim 10, wherein the induction coil includes a series of collinear induction coils each having a noncoaxially aligned soft magnetic wire as the magnetic core, the series of collinear induction coils operably connected to the DC electrical circuit.

16. The system of claim 10, wherein the magnetic core includes three soft magnetic wires substantially parallel to one another and noncoaxially disposed within the induction coil.

17. The system of claim 10, wherein the magnetic core is diagonally disposed within the induction coil to cancel axial symmetry of the induction coil.

18. A method of determining the position and orientation of an induction coil, the method comprising the acts of:
    disposing a magnetic core asymmetrically within the induction coil;
    connecting a DC electrical circuit to ends defining the induction coil, the DC electrical circuit providing a DC current to the induction coil;
    disposing the induction coil in an external AC magnetic field; and
    applying the DC current to adjust a level of saturation of the magnetic core and influence a response signal from the induction coil disposed in the external AC magnetic field to provide the magnetic tracking of the induction coil.

19. The method of claim 18, wherein the act of disposing the magnetic core includes diagonally disposing the magnetic core within the induction coil to cancel axial symmetry of the induction coil.

* * * * *